US011889866B2

(12) United States Patent
Lim

(10) Patent No.: US 11,889,866 B2
(45) Date of Patent: Feb. 6, 2024

(54) HEATER FOR AEROSOL GENERATING DEVICE

(71) Applicant: KT&G CORPORATION, Daejeon (KR)

(72) Inventor: Hun Il Lim, Seoul (KR)

(73) Assignee: KT&G CORPORATION, Daejeon (KR)

( * ) Notice: Subject to any disclaimer, the term of this patent is extended or adjusted under 35 U.S.C. 154(b) by 523 days.

(21) Appl. No.: 17/270,779

(22) PCT Filed: Dec. 21, 2020

(86) PCT No.: PCT/KR2020/018760
§ 371 (c)(1),
(2) Date: Feb. 23, 2021

(87) PCT Pub. No.: WO2021/157854
PCT Pub. Date: Aug. 12, 2021

(65) Prior Publication Data

US 2022/0408812 A1 Dec. 29, 2022

(30) Foreign Application Priority Data

Feb. 7, 2020 (KR) ........................ 10-2020-0015164

(51) Int. Cl.
*A24F 40/46* (2020.01)
*A24F 40/20* (2020.01)
(Continued)

(52) U.S. Cl.
CPC .............. *A24F 40/46* (2020.01); *A24F 40/20* (2020.01); *A24F 40/51* (2020.01); *A24F 40/57* (2020.01);
(Continued)

(58) Field of Classification Search
None
See application file for complete search history.

(56) References Cited

U.S. PATENT DOCUMENTS 6,229,123 B1 * 5/2001 Kochman ................ H05B 3/58 219/549
6,403,935 B2 * 6/2002 Kochman ................ H05B 3/58 219/545
(Continued)

FOREIGN PATENT DOCUMENTS

CN 102589634 A 7/2012
CN 103988576 A 8/2014
(Continued)

OTHER PUBLICATIONS

Communication dated Jun. 28, 2022 from the Japanese Patent Office in Application No. 2021-523846.
(Continued)

*Primary Examiner* — Tho D Ta
(74) *Attorney, Agent, or Firm* — Sughrue Mion, PLLC

(57) ABSTRACT

A heater for an aerosol generating device includes a substrate and a plane heating element formed on one surface of the substrate, wherein the plane heating element includes an electrically conductive track pattern including a sensor seating region formed of a planar track on which an undersurface of a temperature sensor is configured to be seated.

15 Claims, 8 Drawing Sheets

(51) Int. Cl.
*A24F 40/57* (2020.01)
*A24F 40/51* (2020.01)
*H05B 3/34* (2006.01)

(52) U.S. Cl.
CPC ......... *H05B 3/34* (2013.01); *H05B 2203/003* (2013.01); *H05B 2203/007* (2013.01); *H05B 2203/008* (2013.01); *H05B 2203/017* (2013.01)

(56) References Cited

U.S. PATENT DOCUMENTS

| | | | |
|---|---|---|---|
| 11,419,185 | B2 | 8/2022 | Oh et al. |
| 2005/0199610 | A1 | 9/2005 | Ptasienski et al. |
| 2011/0097133 | A1 | 4/2011 | Duru et al. |
| 2012/0152014 | A1 | 6/2012 | Speldrich |
| 2013/0015177 | A1 | 1/2013 | Clothier |
| 2016/0161343 | A1 | 6/2016 | Smith et al. |
| 2017/0067842 | A1 | 3/2017 | Ahn et al. |
| 2019/0380390 | A1 | 12/2019 | Jeong et al. |
| 2020/0046028 | A1 | 2/2020 | Oh et al. |
| 2020/0352231 | A1 | 11/2020 | Han et al. |
| 2020/0352255 | A1 | 11/2020 | Jeong et al. |

FOREIGN PATENT DOCUMENTS

| | | | |
|---|---|---|---|
| CN | 105636707 | A | 6/2016 |
| CN | 106501319 | A | 3/2017 |
| CN | 207836767 | U | 9/2018 |
| CN | 110198642 | A | 9/2019 |
| EP | 1 736 034 | A1 | 12/2006 |
| EP | 2240045 | B1 | 7/2017 |
| GB | 2504074 | A | 1/2014 |
| JP | 2987781 | B2 | 12/1999 |
| JP | 2002-117958 | A | 4/2002 |
| KR | 20120008163 | U * | 11/2012 |
| KR | 10-2018-0117039 | A | 10/2018 |
| KR | 10-2018-0117071 | A | 10/2018 |
| KR | 10-1927134 | B1 | 12/2018 |
| KR | 10-2019-0071157 | A | 6/2019 |
| KR | 10-2029225 | B1 | 10/2019 |
| WO | 98/54931 | A1 | 12/1998 |
| WO | 2005/089023 | A1 | 9/2005 |
| WO | 2011/050964 | A1 | 5/2011 |
| WO | 2018/135888 | A1 | 7/2018 |
| WO | 2018/194291 | A2 | 10/2018 |

OTHER PUBLICATIONS

International Search Report dated Apr. 7, 2021 in Application No. PCT/KR2020/018760.

Extended European Search Report dated Oct. 18, 2021, issued by the European Patent Office in application No. 20855893.2.

Office Action dated Mar. 31, 2023, in Chinese Application No. 202080005923.X.

* cited by examiner

【Figure 1】
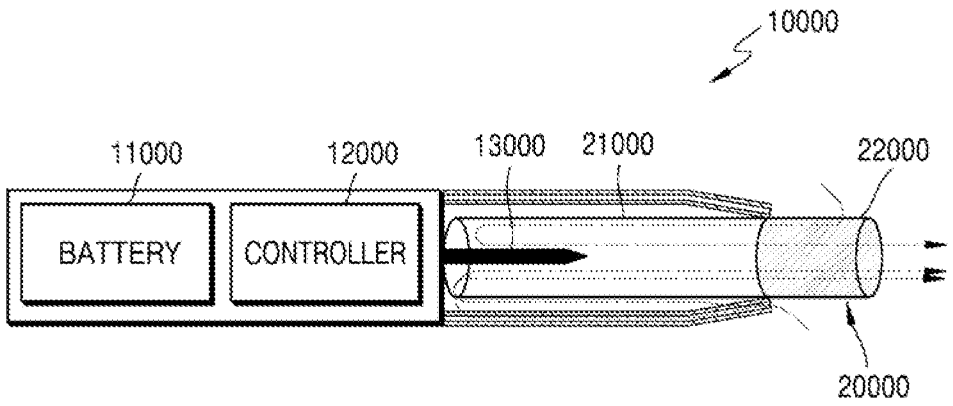
【Figure 2】
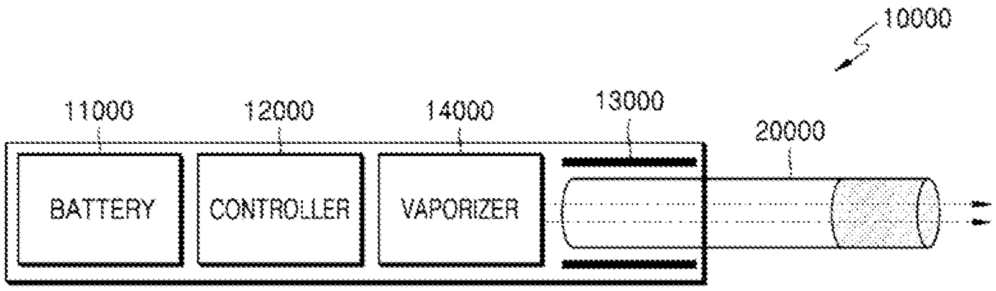
【Figure 3】
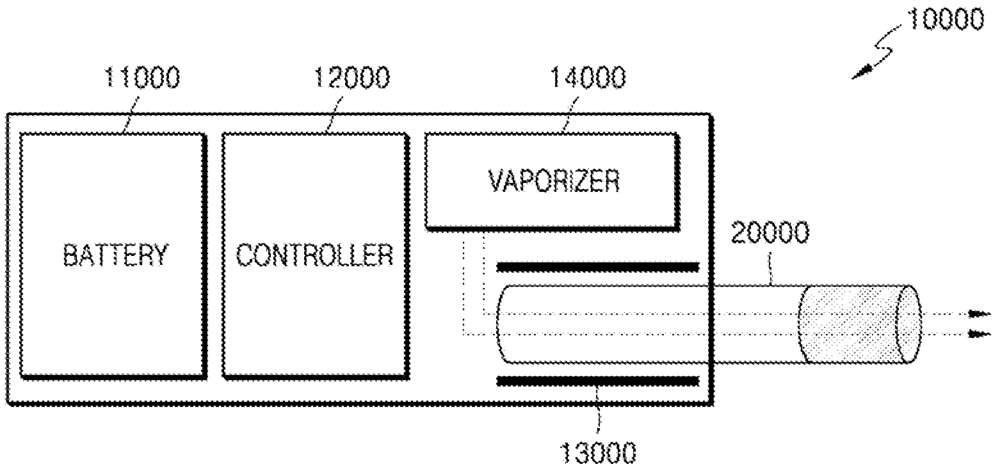

【Figure 4】
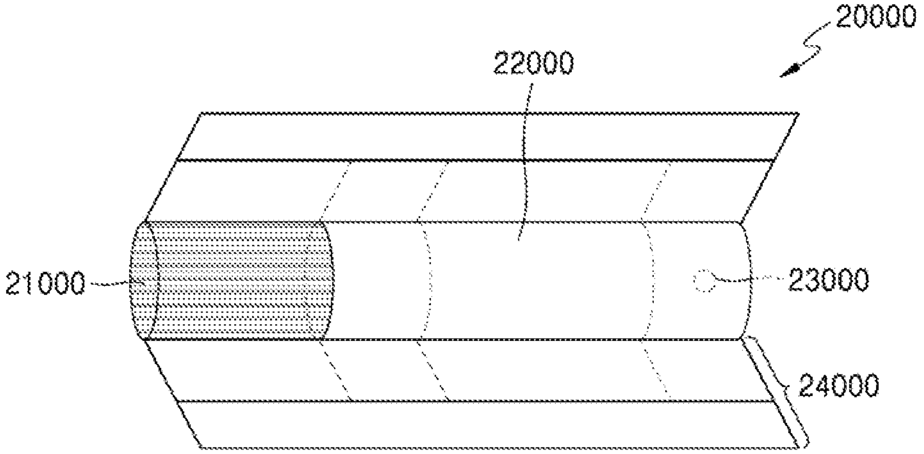
【Figure 5】
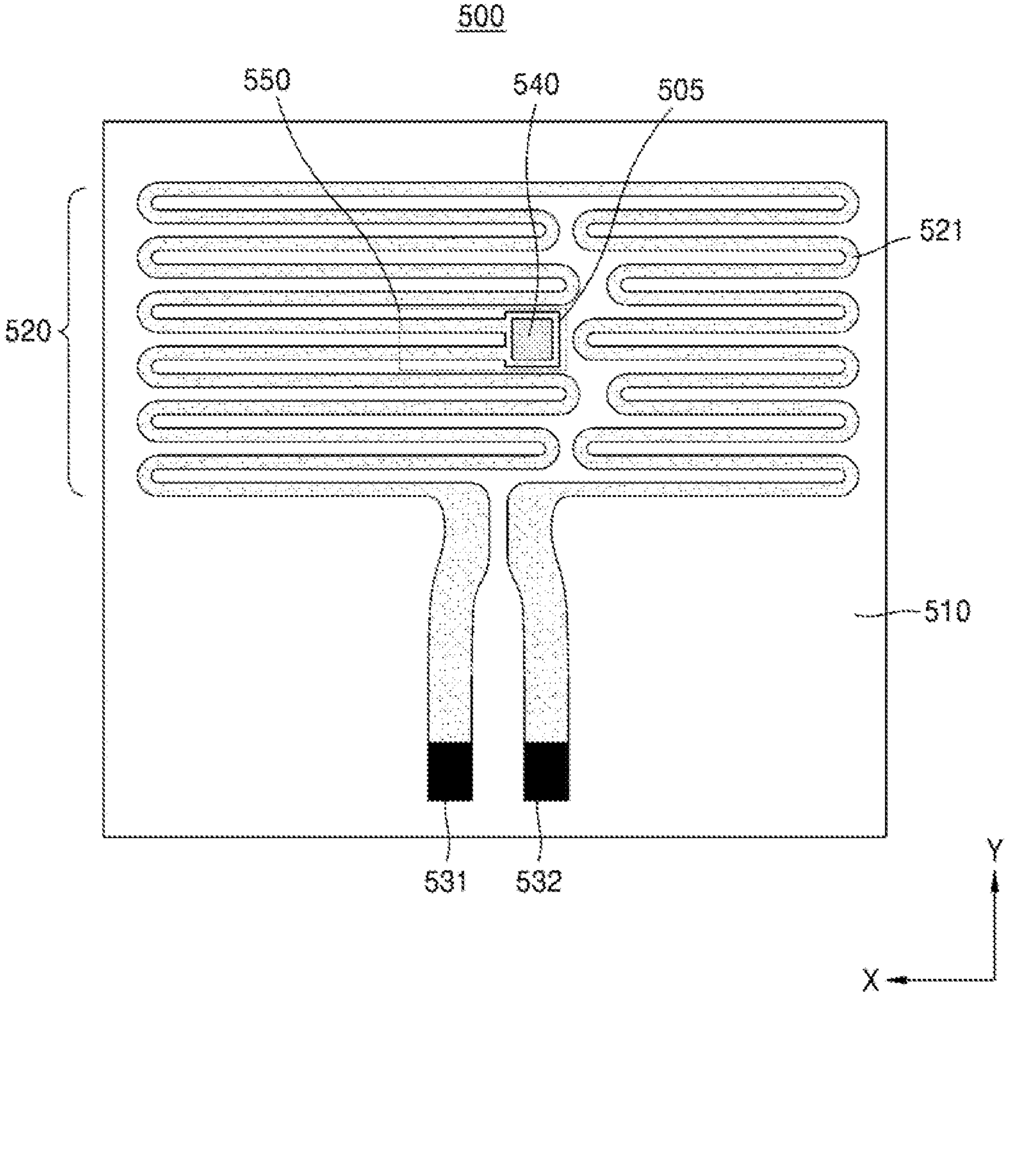

【Figure 6】
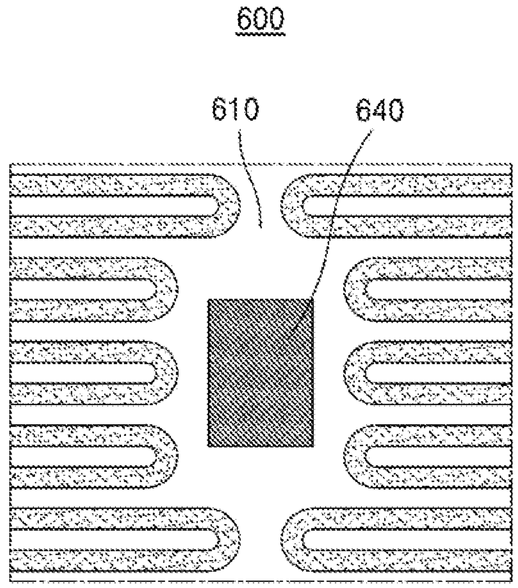

【Figure 7】
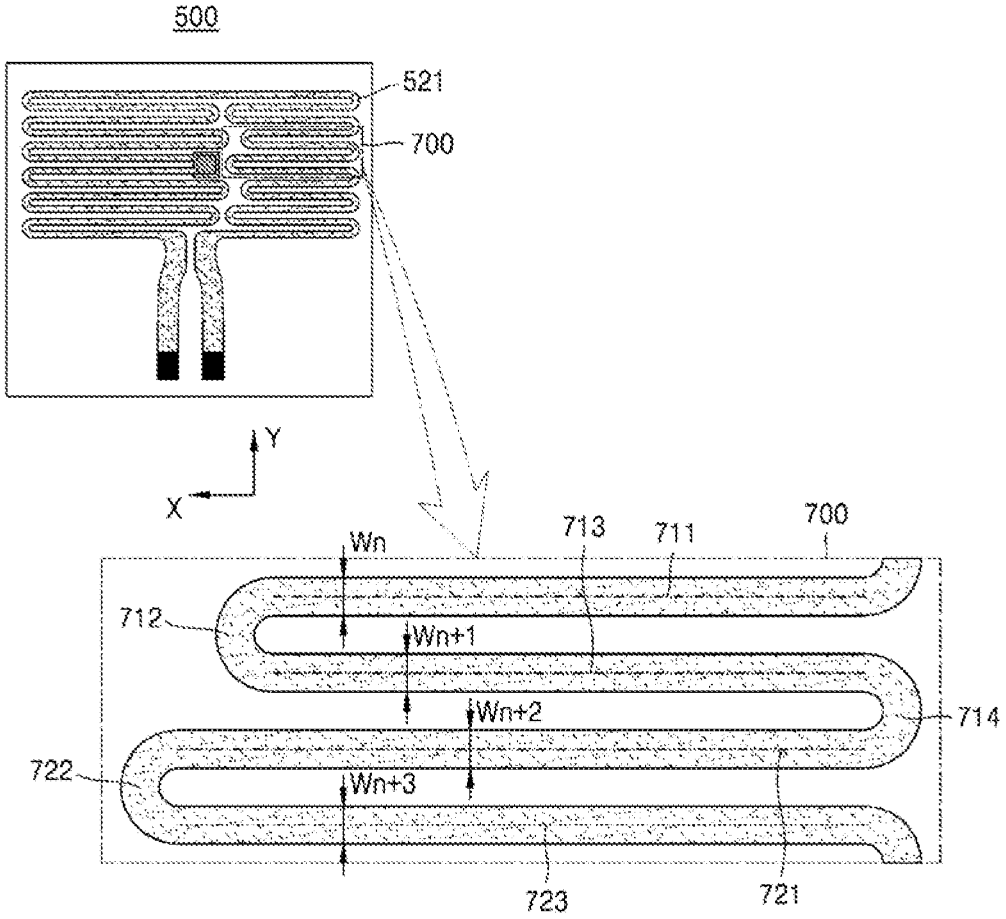

[Figure 8]
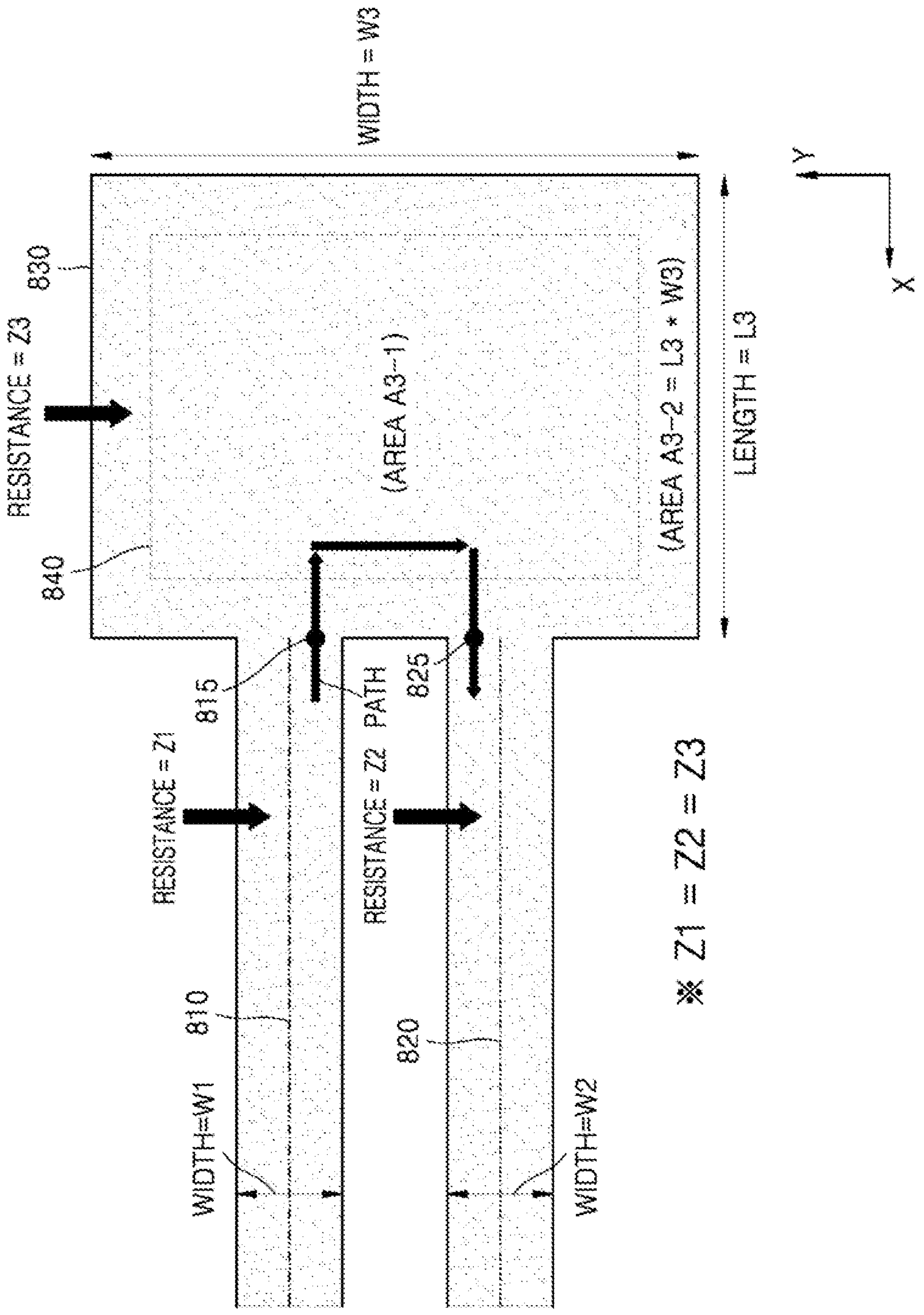

【Figure 9】
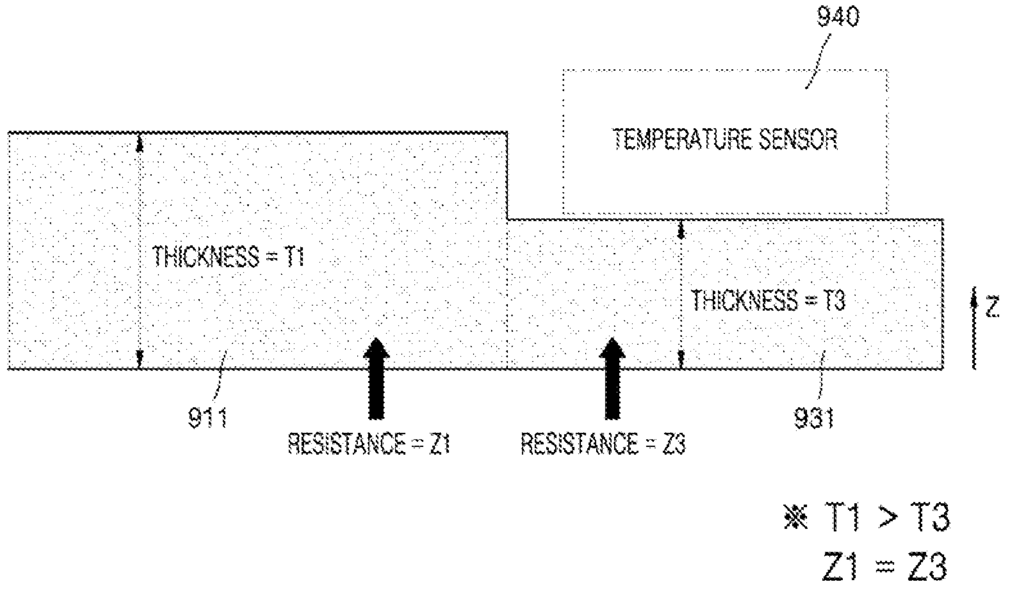
【Figure 10】
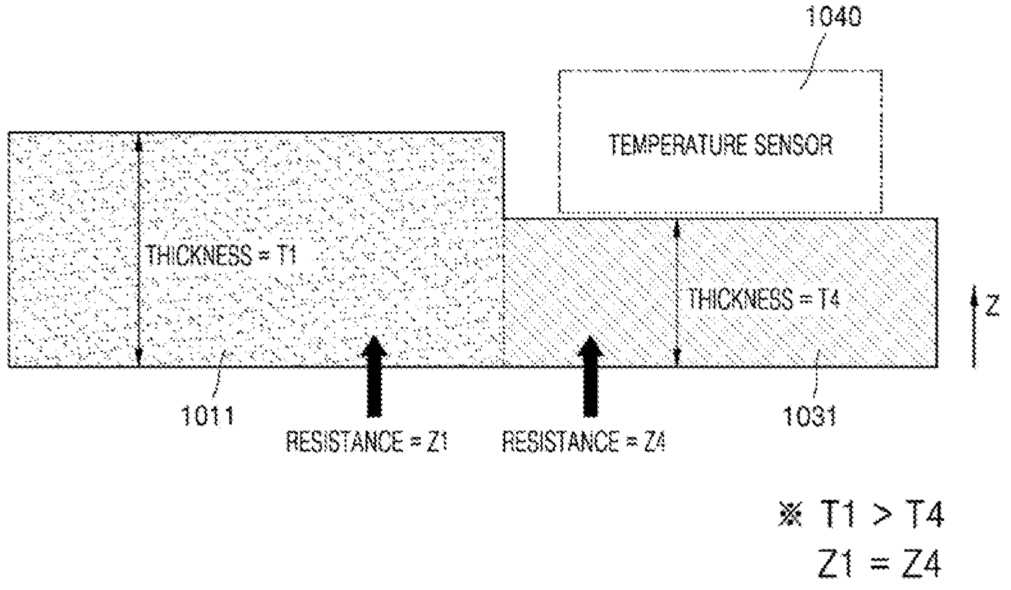

【Figure 11】
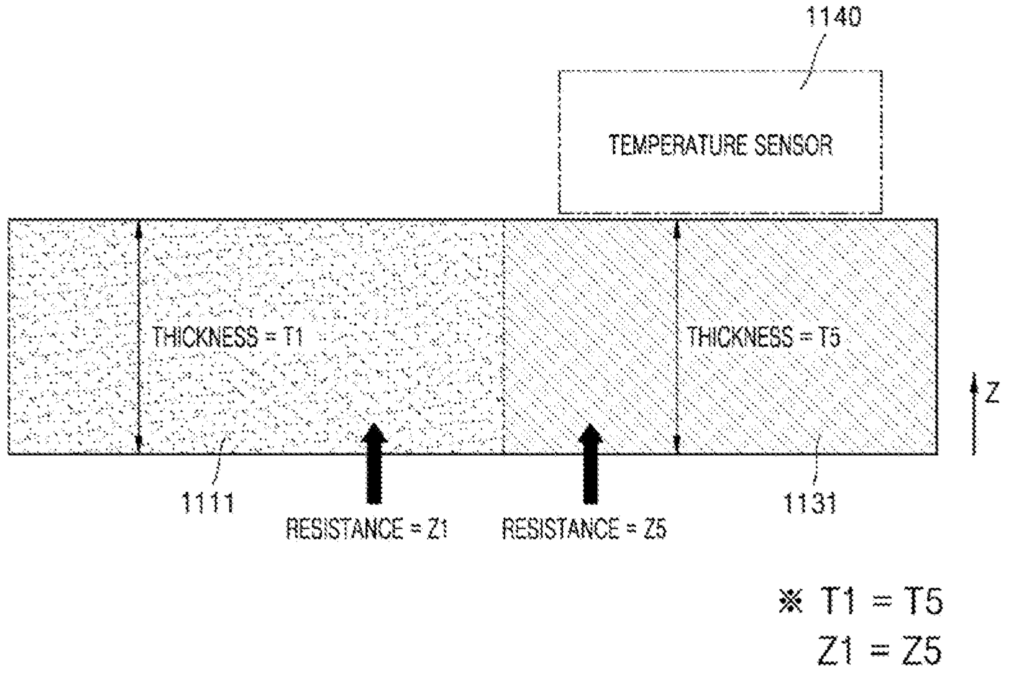
【Figure 12】
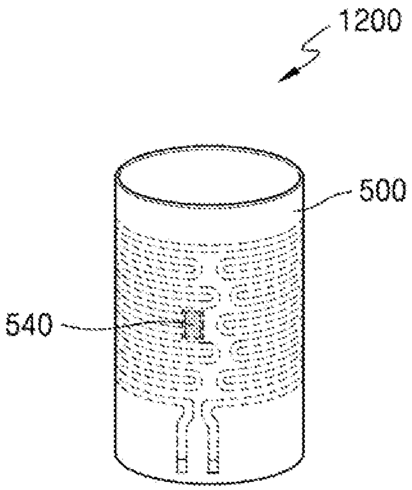

【Figure 13】
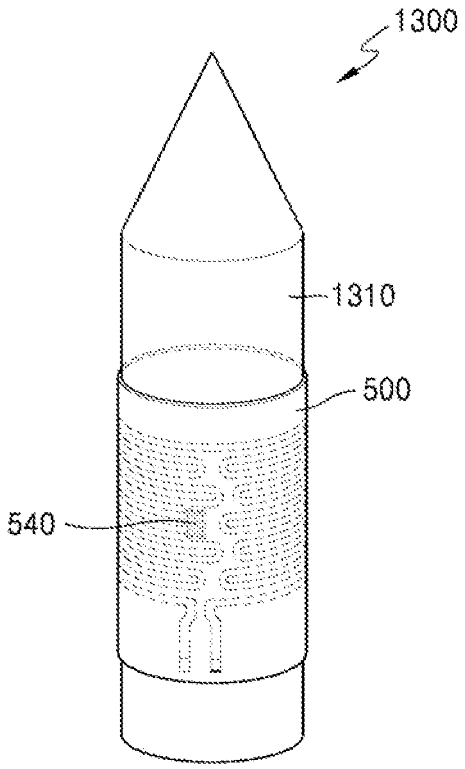

HEATER FOR AEROSOL GENERATING DEVICE

TECHNICAL FIELD

Embodiments of the present disclosure relate to a heater for an aerosol generating device, and more particularly, to a heater for an aerosol generating device having a temperature sensor that senses the temperature of the heater.

BACKGROUND ART

Recently, the demand for alternative methods overcoming the shortcomings of general cigarettes has increased. For example, there is an increasing demand for a method of generating aerosols by heating an aerosol generating material in cigarettes, rather than by combusting cigarettes. Accordingly, studies on a heating-type cigarette or a heating-type aerosol generating device have been actively conducted.

DISCLOSURE

Technical Problem

There is a need to quickly and accurately sense temperature of a heater in heating-type aerosol generating devices.

Technical Solution

Various embodiments of the present disclosure provide a heater for an aerosol generating device. Technical problems to be solved by embodiments of the present disclosure are not limited to the above-described problems, and problems that are not mentioned will be clearly understood by those of ordinary skill in the art from the present disclosure.

According to an aspect, a heater for an aerosol generating device includes a flexible substrate formed of an insulating material; and a plane heating element which is heated by power supplied from a battery to generate aerosols and is formed on one surface of the flexible substrate, wherein the plane heating element is connected in series between two electrodes and includes an electrically conductive track pattern in which linear sub-tracks arranged side by side and bridge tracks connecting between the linear sub-tracks are formed along a zigzag-shaped path, and the electrically conductive track pattern includes a sensor seating region connected in series between a first linear sub-track and a second linear sub-track which are adjacently arranged from among the linear sub-tracks and formed of a planar track having an area on which an undersurface of a temperature sensor is able to be seated.

Advantageous Effects

According to the above, because a temperature sensor is seated on a portion of a track region on an electrically conductive track pattern of a heater to directly sense a temperature of the heater, the temperature of the heater (that is, a temperature of the electrically conductive track pattern) may be accurately and quickly sensed.

DESCRIPTION OF DRAWINGS

FIG. 1 is a diagram illustrating a cigarette inserted into an aerosol generating device according to an embodiment;

FIG. 2 is a diagram illustrating a cigarette inserted into an aerosol generating device according to an embodiment;

FIG. 3 is a diagram illustrating a cigarette inserted into an aerosol generating device according to an embodiment;

FIG. 4 illustrates an example of a cigarette according to an embodiment;

FIG. 5 is a diagram illustrating a heater for an aerosol generating device according to an embodiment;

FIG. 6 is a diagram illustrating an arrangement of a temperature sensor in a different way from that of FIG. 5;

FIG. 7 is a diagram explaining in more detail a structure of an electrically conductive track pattern of a plane heating element, according to an embodiment;

FIG. 8 is a diagram explaining a sensor seating region of an electrically conductive track pattern, according to an embodiment;

FIG. 9 is a diagram illustrating cross-sections of a first linear sub-track and a planar track, which are made of the same electrically conductive material, according to an embodiment;

FIG. 10 is a diagram illustrating cross-sections of a first linear sub-track and a planar track, which are made of different electrically conductive materials, according to an embodiment;

FIG. 11 is a diagram illustrating cross-sections of a first linear sub-track and a planar track, which are made of different electrically conductive materials, according to another embodiment;

FIG. 12 is a diagram illustrating a heater manufactured by using a heating sheet of FIG. 5, according to an embodiment; and FIG. 13 is a diagram illustrating a heater manufactured by using a heating sheet of FIG. 5, according to an embodiment.

BEST MODE

According to one or more embodiments, a heater for an aerosol generating device is provided. The heater includes: a flexible substrate formed of an insulating material; and a plane heating element which is configured to be heated by power supplied from a battery to generate aerosols and is formed on one surface of the flexible substrate, wherein the plane heating element is connected in series between two electrodes, and includes an electrically conductive track pattern that is formed along a zigzag-shaped path and that includes linear sub-tracks arranged side by side and bridge tracks connected to the linear sub-tracks, between the linear sub-tracks, and wherein the electrically conductive track pattern further includes a sensor seating region connected in series between a first linear sub-track and a second linear sub-track which are adjacently arranged from among the linear sub-tracks, the sensor seating region formed of a planar track having an area on which an undersurface of a temperature sensor is configured to be seated.

According to an embodiment, a first resistance value in the first linear sub-track, a second resistance value in the second linear sub-track, and a third resistance value in the planar track are the same, upon heating by the power.

According to an embodiment, the planar track is formed as a flat plate having a thickness less than that of the first linear sub-track and the second linear sub-track in a direction perpendicular to an extending direction of the flexible substrate, and having a width greater than that of each of the first linear sub-track and the second linear sub-track.

According to an embodiment, a thickness of the planar track is determined as a thickness value for having the same resistance value as the first linear sub-track and the second linear sub-track, based on an area of the planar track and a resistance change characteristic of the planar track.

According to an embodiment, the planar track is formed of a same type of electrically conductive material as the first linear sub-track and the second linear sub-track.

According to an embodiment, the planar track is formed of an electrically conductive material having a different thermal coefficient resistance (TCR) from that of each of the first linear sub-track and the second linear sub-track.

According to an embodiment, the first linear sub-track and the second linear sub-track are arranged parallel along the zigzag-shaped path, and the planar track is connected in series between an end point of the first linear sub-track and a start point of the second linear sub-track.

According to an embodiment, the planar track is manufactured by an etching process or a printing process.

According to an embodiment, the heater is implemented in an external heater form that is configured to heat an outside of a cigarette inserted into the aerosol generating device.

According to an embodiment, a difference between a third resistance value in the planar track and each of a first resistance value in the first linear sub-track and a second resistance value in the second linear sub-track is within a predetermined threshold range.

According to an embodiment, each of a first resistance value in the first linear sub-track, a second resistance value in the second linear sub-track, and a third resistance value in the planar track is a resistance value between 0.5Ω and 2.0Ω.

According to an embodiment, the temperature sensor is adhered to and arranged on the sensor seating region, and is configured to sense at least one from among a temperature of the heater and a temperature of a cigarette inserted into the aerosol generating device.

According to one or more embodiments, an aerosol generating device is provided. The aerosol generating device includes: a heater; a temperature sensor arranged on the heater and configured to sense a temperature of the heater; a battery configured to supply power to the heater; and a controller configured to control the power supplied to the heater from the battery and monitor the temperature sensed by the temperature sensor. The heater includes: a flexible substrate formed of an insulating material; and a plane heating element configured to be heated by the power supplied from the battery to generate aerosols and is formed on one surface of the flexible substrate, wherein the plane heating element is connected in series between two electrodes, and includes an electrically conductive track pattern that is formed along a zigzag-shaped path and that includes linear sub-tracks arranged side by side and bridge tracks connected to the linear sub-tracks, between the linear sub-tracks, and wherein the electrically conductive track pattern further includes a sensor seating region connected in series between a first linear sub-track and a second linear sub-track which are adjacently arranged from among the linear sub-tracks, the sensor seating region formed of a planar track having an area on which an undersurface of the temperature sensor is seated.

According to an embodiment, a first resistance value in the first linear sub-track, a second resistance value in the second linear sub-track, and a third resistance value in the planar track are the same, upon heating by the power.

According to an embodiment, the controller is configured to control the power supplied to the heater based on the temperature that is monitored.

MODE FOR INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used to describe the various embodiments of the present disclosure should be defined based on the meanings of the terms and the descriptions provided herein.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element is referred to as being "over," "above," "on," "below," "under," "beneath," "connected to" or "coupled to" another element, it can be directly over, above, on, below, under, beneath, connected or coupled to the other element or intervening elements may be present. In contrast, when an element is referred to as being "directly over," "directly above," "directly on," "directly below," "directly under," "directly beneath," "directly connected to" or "directly coupled to" another element, there are no intervening elements present.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

In the present disclosure, while such terms as "first," "second," etc., may be used to describe various components, such components must not be limited to the above terms. The above terms are used only to distinguish one component from another.

Hereinafter, example embodiments of the present disclosure will now be described more fully with reference to the accompanying drawings, such that one of ordinary skill in the art may easily work the present disclosure. Embodiments of the disclosure may, however, be embodied in many different forms and should not be construed as being limited to the example embodiments set forth herein.

FIGS. 1 through 3 are diagrams showing examples in which a cigarette is inserted into an aerosol generating device.

Referring to FIG. 1, the aerosol generating device 10000 may include a battery 11000, a controller 12000, and a heater 13000. Referring to FIGS. 2 and 3, the aerosol generating device 10000 may further include a vaporizer 14000. Also, a cigarette 20000 may be inserted into an inner space of the aerosol generating device 10000.

FIGS. 1 through 3 illustrate example components of the aerosol generating device 10000. However, it will be understood by one of ordinary skill in the art related to embodiments of the present disclosure that other components may be further included in the aerosol generating device 10000, in addition to the components illustrated in FIGS. 1 through 3.

Also, FIGS. 1 through 3 illustrate that the aerosol generating device 10000 includes the heater 13000. However, in some embodiments, the heater 13000 may be omitted.

FIG. 1 illustrates that the battery 11000, the controller 12000, and the heater 130000 are arranged in series. Also, FIG. 2 illustrates that the battery 11000, the controller 12000, the vaporizer 14000, and the heater 13000 are arranged in series. Also, FIG. 3 illustrates that the vaporizer 14000 and the heater 13000 are arranged in parallel. However, the internal structure of the aerosol generating device 10000 is not limited to the structures illustrated in FIGS. 1 through 3. In other words, in some embodiments, the aerosol generating device 10000, the battery 11000, the controller 12000, the heater 13000, and the vaporizer 14000 may be differently arranged.

When the cigarette 20000 is inserted into the aerosol generating device 10000, the aerosol generating device 10000 may operate the heater 13000 and/or the vaporizer 14000 to generate aerosol from the cigarette 20000 and/or the vaporizer 14000. The aerosol generated by the heater 13000 and/or the vaporizer 14000 is delivered to a user by passing through the cigarette 20000.

According to some embodiments, even when the cigarette 20000 is not inserted into the aerosol generating device 10000, the aerosol generating device 10000 may heat the heater 13000.

The battery 11000 supplies electric power to be used for the aerosol generating device 10000 to operate. For example, the battery 11000 may supply power to heat the heater 13000 or the vaporizer 14000, and may supply power for operating the controller 12000. Also, the battery 11000 may supply power for operations of a display, a sensor, a motor, etc. mounted in the aerosol generating device 10000.

The controller 12000 may generally control operations of the aerosol generating device 10000. In detail, the controller 12000 may control not only operations of the battery 11000, the heater 13000, and the vaporizer 14000, but also operations of other components included in the aerosol generating device 10000. Also, the controller 12000 may check a state of each of the components of the aerosol generating device 10000 to determine whether or not the aerosol generating device 10000 is able to operate.

The controller 12000 may include at least one processor. A processor may be implemented as an array of a plurality of logic gates or may be implemented as a combination of a general-purpose microprocessor and a memory in which a program executable in the microprocessor is stored. It will be understood by one of ordinary skill in the art that the processor may be implemented in other forms of hardware.

The heater 13000 may be heated by the power supplied from the battery 11000. For example, when the cigarette 20000 is inserted into the aerosol generating device 10000, the heater 13000 may be located outside the cigarette 20000. Thus, the heated heater 13000 may increase a temperature of an aerosol generating material in the cigarette 20000.

The heater 13000 may include an electro-resistive heater. For example, the heater 13000 may include an electrically conductive track, and the heater 13000 may be heated when currents flow through the electrically conductive track. However, the heater 13000 is not limited to the example described above and may include all heaters which may be heated to a desired temperature. Here, the desired temperature may be pre-set in the aerosol generating device 10000 or may be set as a temperature desired by a user.

As another example, the heater 13000 may include an induction heater. In detail, the heater 13000 may include an electrically conductive coil for heating a cigarette in an induction heating method, and the cigarette may include a susceptor which may be heated by the induction heater.

For example, the heater 13000 may include a tube-type heating element, a plate-type heating element, a needle-type heating element, or a rod-type heating element, and may heat the inside or the outside of the cigarette 20000, according to the shape of the heating element.

Also, the aerosol generating device 10000 may include a plurality of the heater 13000. Here, the plurality of the heater 13000 may be inserted into the cigarette 20000 or may be arranged outside the cigarette 20000. Also, some of the plurality of the heater 13000 may be inserted into the cigarette 20000 and the others may be arranged outside the cigarette 20000. In addition, the shape of the heater 13000 is not limited to the shapes illustrated in FIGS. 1 through 3 and may include various shapes.

The vaporizer 14000 may generate an aerosol by heating a liquid composition and the generated aerosol may pass through the cigarette 20000 to be delivered to a user. In other words, the aerosol generated via the vaporizer 14000 may move along an air flow passage of the aerosol generating device 10000 and the air flow passage may be configured such that the aerosol generated via the vaporizer 14000 passes through the cigarette 20000 to be delivered to the user.

For example, the vaporizer 14000 may include a liquid storage, a liquid delivery element, and a heating element, but it is not limited thereto. For example, the liquid storage, the liquid delivery element, and the heating element may be included in the aerosol generating device 10000 as independent modules.

The liquid storage may store a liquid composition. For example, the liquid composition may be a liquid including a tobacco-containing material having a volatile tobacco flavor component, or a liquid including a non-tobacco material. The liquid storage may be formed to be attached/detached to/from the vaporizer 14000 or may be formed integrally with the vaporizer 14000.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element configured to heat the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be wound around the liquid delivery element. The heating element may be heated by a current supply and may transfer heat to the liquid composition in contact with the heating element, thereby heating the liquid composition. As a result, aerosol may be generated.

For example, the vaporizer 14000 may be referred to as a cartomizer or an atomizer, but it is not limited thereto.

The aerosol generating device 10000 may further include general-purpose components in addition to the battery 11000, the controller 12000, the heater 13000, and the vaporizer 14000. For example, the aerosol generating device 10000 may include a display capable of outputting visual information and/or a motor configured to output haptic information. Also, the aerosol generating device 10000 may include at least one sensor (a puff detection sensor, a temperature detection sensor, a cigarette insertion detection sensor, etc.). Also, the aerosol generating device 10000 may be formed as a structure where, even when the cigarette 20000 is inserted into the aerosol generating device 10000, external air may be introduced or internal air may be discharged.

Although not illustrated in FIGS. 1 through 3, the aerosol generating device 10000 and an additional cradle may form together a system. For example, the cradle may be used to charge the battery 11000 of the aerosol generating device 10000. Alternatively, the heater 13000 may be heated when the cradle and the aerosol generating device 10000 are coupled to each other.

The cigarette 20000 may be similar to a general combustive cigarette. For example, the cigarette 20000 may be divided into a first portion including an aerosol generating material and a second portion including a filter, etc. Alternatively, the second portion of the cigarette 20000 may also include an aerosol generating material. For example, an aerosol generating material made in the form of granules or capsules may be inserted into the second portion.

The entire first portion may be inserted into the aerosol generating device 10000, and the second portion may be exposed to the outside. Alternatively, only a portion of the first portion may be inserted into the aerosol generating device 10000, or the entire first portion and a portion of the second portion may be inserted into the aerosol generating device 10000. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 10000. For example, the opening and closing and/or a size of the air passage formed in the aerosol generating device 10000 may be adjusted by the user. Accordingly, the amount of smoke and a smoking impression may be adjusted by the user. As another example, the external air may flow into the cigarette 20000 through at least one hole formed in a surface of the cigarette 20000.

Hereinafter, an example of the cigarette 20000 will be described with reference to FIG. 4.

Referring to FIG. 4, the cigarette 20000 may include a tobacco rod 21000 and a filter rod 22000. The first portion described above with reference to FIGS. 1 through 3 may include the tobacco rod 21000, and the second portion may include the filter rod 22000.

FIG. 4 illustrates that the filter rod 22000 includes a single segment. However, the filter rod 22000 is not limited thereto. In other words, the filter rod 22000 may include a plurality of segments. For example, the filter rod 22000 may include a first segment configured to cool an aerosol and a second segment configured to filter a certain component included in the aerosol. Also, according to some embodiments, the filter rod 22000 may further include at least one segment configured to perform other functions.

The cigarette 2000 may be packaged via at least one wrapper 24000. The wrapper 24000 may have at least one hole through which external air may be introduced or internal air may be discharged. For example, the cigarette 20000 may be packaged via one wrapper 24000. As another example, the cigarette 20000 may be doubly packaged via at least two wrappers 24000. For example, the tobacco rod 21000 may be packaged via a first wrapper, and the filter rod 22000 may be packaged via a second wrapper. Also, the tobacco rod 21000 and the filter rod 22000, which are respectively packaged via separate wrappers, may be coupled to each other, and the entire cigarette 20000 may be packaged via a third wrapper. When each of the tobacco rod 21000 and the filter rod 22000 includes a plurality of segments, each segment may be packaged via a separate wrapper. Also, the entire cigarette 20000 including the plurality of segments, which are respectively packaged via the separate wrappers and which are coupled to each other, may be re-packaged via another wrapper.

The tobacco rod 21000 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 21000 may include other additives, such as flavors, a wetting agent, and/or organic acid. Also, the tobacco rod 21000 may include a flavored liquid, such as menthol or a moisturizer, which is injected to the tobacco rod 21000.

The tobacco rod 21000 may be manufactured in various forms. For example, the tobacco rod 21000 may be formed as a sheet or a strand. Also, the tobacco rod 21000 may be formed as a pipe tobacco, which is formed of tiny bits cut from a tobacco sheet. Also, the tobacco rod 21000 may be surrounded by a heat conductive material. For example, the heat conductive material may be, but is not limited to, a metal foil such as aluminum foil. For example, the heat conductive material surrounding the tobacco rod 21000 may uniformly distribute heat transmitted to the tobacco rod 21000, and thus, the heat conductivity applied to the tobacco rod may be increased and taste of the tobacco may be improved. Also, the heat conductive material surrounding the tobacco rod 21000 may function as a susceptor heated by the induction heater. Here, although not illustrated in the drawings, the tobacco rod 21000 may further include an additional susceptor, in addition to the heat conductive material surrounding the tobacco rod 21000.

The filter rod 22000 may include a cellulose acetate filter. Shapes of the filter rod 22000 are not limited. For example, the filter rod 22000 may include a cylinder-type rod or a tube-type rod having a hollow inside. Also, the filter rod 22000 may include a recess-type rod. When the filter rod 22000 includes a plurality of segments, at least one of the plurality of segments may have a different shape.

The filter rod 22000 may be formed to generate flavors. For example, a flavoring liquid may be injected onto the filter rod 22000, or an additional fiber coated with a flavoring liquid may be inserted into the filter rod 22000.

Also, the filter rod 22000 may include at least one capsule 23000. Here, the capsule 23000 may generate a flavor or an aerosol. For example, the capsule 23000 may have a configuration in which a liquid containing a flavoring material is wrapped with a film. For example, the capsule 23000 may have a spherical or cylindrical shape, but is not limited thereto.

When the filter rod 22000 includes a segment configured to cool the aerosol, the cooling segment may include a polymer material or a biodegradable polymer material. For example, the cooling segment may include pure polylactic acid alone, but the material for forming the cooling segment is not limited thereto. In some embodiments, the cooling segment may include a cellulose acetate filter having a plurality of holes. However, the cooling segment is not limited to the above-described example and is not limited as long as the cooling segment cools the aerosol.

Although not illustrated in FIG. 4, the cigarette 20000 according to an embodiment may further include a front-end filter. The front-end filter may be located on a side of the tobacco rod 21000, the side facing the filter rod 22000. The front-end filter may prevent the tobacco rod 21000 from being detached outwards and prevent a liquefied aerosol from flowing into the aerosol generating device 10000 (refer to FIGS. 1 through 3) from the tobacco rod 21000, during smoking.

FIG. 5 is a diagram for explaining a heater for an aerosol generating device according to an embodiment.

The heater 13000 may be manufactured in a shape, in which a cylinder and a cone are combined, and implemented in an internal heater form into which the cigarette 20000 is inserted, as shown in FIG. 1. Alternatively, the heater 13000 may be manufactured in a cylindrical (or tubular) shape and implemented in an external heater form heating the outside of the cigarette 20000, as shown in FIGS. 2 and 3.

Referring to FIG. 5, the heater 13000 may be manufactured based on a heating sheet 500 having a plane structure for manufacturing an internal heater or an external heater.

The heater 13000 may include the heating sheet 500 formed by using an electrically resistive material. For example, the heater 13000 may be manufactured from the plane structure of the heating sheet 500 including a plane heating element 520, that is electrically resistive, such as an electrically conductive track. The heating sheet 500 of the heater 13000 may be supplied with power from the battery 11000 (refer to FIGS. 1 through 3) and may be heated as a current flows through the plane heating element 520.

For example, for stable use of the heater 13000, power according to standards of 3.2 V, 2.4 A, and 8 W may be supplied to the plane heating element 520 of the heating sheet 500, but is not limited thereto. For example, when power is supplied to the heating sheet 500 of the heater 13000, a surface temperature of the heater 13000 may increase to 400° C. or more. The surface temperature of the heater 13000 may increase to about 350° C. before 15 seconds have elapsed from when the power is first supplied to the heater 13000. However, a temperature range to be increased may be variously changed.

Referring to the plane structure of the heating sheet 500 of the heater 13000, the heating sheet 500 includes a flexible substrate 510 formed of an insulating material (an electrical insulating material or a thermal insulating material), and the plane heating element 520 heated by the power supplied from the battery 11000 to generate aerosols and formed on one surface of the flexible substrate 510.

The flexible substrate 510 may correspond to a green sheet composed of a ceramic composite material. Alternatively, the flexible substrate 510 may be made of paper, glass, ceramic, an anodized metal, a coated metal, or polyimide. That is, the flexible substrate 510 may be an insulating substrate, which is manufactured from various suitable materials and has flexibility.

The plane heating element 520 may be connected in series between two electrodes 531 and 532 and includes an electrically conductive track pattern 521 formed along a zigzag-shaped path. Like the flexible substrate 510, the plane heating element 520 may also be flexible.

The electrically conductive track pattern 521 may be made of an electrically resistive material and a heating temperature thereof may be determined according to power consumption of resistance, and a resistance value of the electrically conductive track pattern 521 may be set based on the power consumption of resistance of the electrically conductive track pattern 521.

For example, the resistance value of the electrically conductive track pattern 521 may have a value between 0.5Ω to 2.0Ω, preferably 0.7Ω to 0.85Ω at room temperature 25° C., but a range of the resistance value is not limited thereto and may vary. The resistance value of the electrically conductive track pattern 521 may be variously set according to a configuring material, length, width, thickness, pattern, or the like of the electrically resistive material.

The electrically conductive track pattern 521 may have an internal resistance level that increases as temperature increases according to a resistance temperature coefficient characteristic. For example, in a predetermined temperature range, the temperature of the electrically conductive track pattern 521 and the size of resistance may be proportional.

The electrically conductive track pattern 521 may be made of tungsten, gold, platinum, silver copper, nickel palladium, or a combination thereof. In addition, the electrically conductive track pattern 521 may be doped with a suitable dopant and may include an alloy.

The two electrodes 531 and 532 are connected to the battery 11000, and the electrically conductive track pattern 521 receives power (current) from the battery 11000 through the two electrodes 531 and 532. Unlike a heating region of the electrically conductive track pattern 521 of the plane heating element 520, the two electrodes 531 and 532 correspond to a non-heating region that hardly generates heat, one (for example, the electrode 532) of the two electrodes 531 and 532 corresponds to an anode electrode to which current is input, and the other one (for example, the electrode 531) corresponds to a cathode electrode through which current is output.

According to the present embodiment, the electrically conductive track pattern 521 includes a sensor seating region 505 formed of a planar track having an area on which an undersurface of a temperature sensor 540 may be seated (or mounted).

The temperature sensor 540 senses a temperature of the heater 13000 heated by the electrically conductive track pattern 521. As shown in FIG. 5, because a seating portion of the temperature sensor 540 is above a portion of a track region (the sensor seating region 505) of the electrically conductive track pattern 521, the temperature sensor 540 may be in direct contact with the electrically conductive track pattern 521 to more accurately and quickly sense the temperature of the heater 13000 (that is, the temperature of the electrically conductive track pattern 521). Accordingly, because the controller (12000 of FIGS. 1 through 3) may more accurately and precisely monitor the temperature of the heater 13000 through this way, power supplied to the heater 13000 may be more accurately and precisely controlled depending on the monitored temperature.

FIG. 6 is a diagram explaining an arrangement of a temperature sensor in a different way from that of FIG. 5.

Referring to FIG. 6, unlike FIG. 5, when a temperature sensor 640 is not seated on an electrically conductive track pattern but is seated on a substrate 610 in a heating sheet 600, the temperature sensor 640 may indirectly sense a temperature of the electrically conductive track pattern. Accordingly, because the temperature sensor 640 as arranged in FIG. 6 may not directly sense the temperature of a heater, an actual temperature of the heater is difficult to be accurately sensed, and a reaction speed of the temperature sensor 640 is also slow, and thus, the monitoring of temperature and power control of a controller (e.g. controller 12000 of FIGS. 1 to 3) may be inefficient.

Referring again to FIG. 5, unlike the arrangement of the temperature sensor of FIG. 6, because the sensor seating region 505 is provided on the electrically conductive track pattern 521 such that the temperature sensor 540 may directly contact the electrically conductive track pattern 521, the temperature of the heater (e.g. heater 13000) may be accurately measured at a higher speed.

FIG. 7 is a diagram explaining in more detail a structure of an electrically conductive track pattern of a plane heating element, according to an embodiment.

Referring to FIG. 7, an enlarged view of a partial region 700 in the electrically conductive track pattern 521 of the heating sheet 500 is shown.

As described above, the electrically conductive track pattern 521 is formed along a zigzag-shaped path on the flexible substrate 510. In detail, referring to the partial region 700, in the electrically conductive track pattern 521, linear sub-tracks 711, 713, 721, and 723 arranged side by side and bridge tracks 712, 714, and 722 connecting between the linear sub-tracks 711, 713, 721, and 723 are formed along a zigzag-shaped path.

For example, the bridge track 712 is connected in series between the linear sub-track 711 and the linear sub-track 713, the bridge track 714 is connected in series between the linear sub-track 713 and the linear sub-track 721, and the bridge track 722 is connected in series between the linear sub-track 721 and the linear sub-track 723. Herein, terms of the linear sub-tracks 711, 713, 721, and 723 and the bridge tracks 712, 714, and 722 are only terms distinguishing and referring to some portions of the electrically conductive track pattern 521 for convenience of explanation, and the linear sub-tracks 711, 713, 721, and 723 and the bridge tracks 712, 712, and 722 are portions of the electrically conductive track pattern 521 integrally manufactured by the same electrically conductive material. FIG. 7 illustrates that the bridge tracks 712, 712, and 722 have a curved shape, but is not limited thereto, and the bridge tracks 712, 714, and 722 may be formed in various other shapes.

All widths (in a Y-axis direction of FIG. 7) Wn, Wn+1, Wn+2, and Wn+3 of each of the linear sub-tracks 711, 713, 721, and 723 are preferably the same so that all of the linear sub-tracks 711, 713, 721, and 723 have the same resistance value, but are not limited thereto.

Lengths (in an X-axis direction of FIG. 7) of each of the linear sub-tracks 711, 713, 721, and 723 may be the same or different according to each position of the linear sub-tracks 711, 713, 721, and 723 in the electrically conductive track pattern 521.

Further, the zigzag shape of the electrically conductive track pattern 521 formed in the heating sheet 500 described in FIGS. 5 and 7 is merely an example for convenience of description, and the shape of the electrically conductive track pattern 521 according to embodiments of the present disclosure are not limited thereto and may be formed in other shapes.

FIG. 8 is a diagram explaining a sensor seating region of an electrically conductive track pattern, according to an embodiment.

Referring to FIG. 8, an enlarged view of a partial region 550 (refer to FIG. 5) of the electrically conductive track pattern 521 (refer to FIG. 5) including the sensor seating region 505 (refer to FIG. 5) is shown.

The electrically conductive track pattern 521 includes the sensor seating region 505 connected in series between a first linear sub-track 810 and a second linear sub-track 820 which are adjacently arranged from among linear sub-tracks and formed of a planar track 830 having an area A3-1 on which an undersurface 840 of the temperature sensor 540 (refer to FIG. 5) may be seated.

The first linear sub-track 810 and the second linear sub-track 820 may be arranged in parallel on a zigzag-shaped path of the electrically conductive track pattern 521, but are not limited thereto. In FIG. 8, the path is illustrated in a direction of arrows, which may be a direction of flow of current in the electrically conductive track pattern 521 between the two electrodes 521 and 532 (refer to FIG. 5). However, for convenience of explanation, the path in FIG. 8 is illustrated as being in a clockwise direction, but is not limited thereto. The path may be in a counterclockwise direction and the direction of flow of current may be in an opposite direction.

The planar track 830 may be connected in series between an end point 815 of the first linear sub-track 810 and a start point 825 of the second linear sub-track 820 on the path.

The planar track 830 may be made of the same type of an electrically conductive material as the first linear sub-track 810 and the second linear sub-track 820, and the planar track 830 may be formed by an etching process or a printing process when manufacturing the electrically conductive track pattern 521 on the flexible substrate 510 (refer to FIG. 5).

However, embodiments of the present disclosure are not limited thereto. The planar track 830 may be made of a different type of an electrically conductive material having a different thermal coefficient resistance (TCR) from that of the first linear sub-track 810 and the second linear sub-track 820. In this case, the planar track 830 may be formed by an etching process or a printing process when manufacturing the electrically conductive track pattern 521 on the flexible substrate 510.

Referring to FIG. 8, an area A3-2 of the planar track 830 may be greater than the area A3-1 on which the undersurface 840 of the temperature sensor 540 may be seated, and may be calculated as a product of a width W3 and a length L3 of the planar track 830. As described above, the width W3 of the planar track 830 may be formed to be greater than a width W1 of the first linear sub-track 810 and a width W2 of the second linear sub-track 820.

When the temperature sensor 540 is seated on the planar track 830, the temperature sensor 540 may directly sense the temperature of the heater (the temperature of the electrically conductive track pattern 521). Accordingly, when the electrically conductive track pattern 521 is heated by power supplied from the battery 11000 (refer to FIGS. 1 through 3), the temperature of the planar track 830 is preferably the same as the temperature of the first linear sub-track 810, the temperature of the second linear sub-track 820, and furthermore the temperature of the heater (the temperature of the electrically conductive track pattern 521).

Assuming that linear sub-tracks and a planar track are made of the same electrically conductive material, a resistance value in the linear sub-tracks may be generally greater than a resistance value in the planar track when power is supplied and current flows. A temperature of the planar track and a temperature of the linear sub-tracks may be measured as the same value only when the resistance value of the planar track is the same as the resistance value of the linear sub-tracks when power is supplied. Accordingly, to this end, various methods, such as a method of adjusting a thickness of the planar track, a method of manufacturing the planar track by using other types of electrically conductive materials, or the like, may be used.

For example, the planar track 830 may be formed as a flat plate having a thickness less than that of the first linear sub-track 810 and the second linear sub-track 820 in a direction (a Z-axis) perpendicular to the flexible substrate 510 (refer to FIG. 5).

In detail, a thickness of the planar track 830 having the area A3-2 may correspond to a thickness value for having a resistance value Z3 equal to a resistance value Z1 of the first linear sub-track 810 and a resistance value Z2 of the second linear sub-track 820.

That is, in the electrically conductive track pattern 521 according to the present embodiment, all of the resistance value Z1 in the first linear sub-track 810, the second resistance value Z2 in the second linear sub-track 820, and the resistance value in the planar track 830 may be preferably the same when heated by the power supplied from the battery 11000. For example, the resistance values Z1, Z2, Z3 may be resistance values preferably selected from 0.5Ω to 2.0Ω, which is only an example, and a resistance value range is not limited thereto.

As a result, even when the planar track 830 is made of the same electrically conductive material as the first linear track 810 and the second linear track 820 or is made of a different electrically conductive material from that of the first linear track 810 and the second linear track 820, all of the resistance value Z1 in the first linear sub-track 810, the resistance value Z2 in the second linear sub-track 820, and the resistance value Z3 in the planar track 830 are preferably the same when heating the electrically conductive track pattern 521, so that the temperature sensor 540 seated may sense an accurate temperature of the heater (that is, the temperature of the electrically conductive track pattern 521). In other words, all resistance change characteristics (for example, TCR, a resistance temperature coefficient, or the like) in the first linear sub-track 810, the second linear sub-track 820, and the planar track 830 when heating the electrically conductive track pattern 521 are preferably the same.

However, embodiments of the present disclosure are not limited thereto. According to another embodiment, in the electrically conductive track pattern 521, a difference between the resistance value Z3 in the planar track 830 and each of the resistance value Z1 in the first linear sub-track 810 and the resistance value Z2 in the second linear sub-track 820 may be within a predetermined threshold range when heated by power supplied from the battery 11000. In this case, an error in temperature sensing due to the difference in resistance values may be corrected by compensation of the controller 12000 (refer to FIGS. 1 through 3).

FIG. 9 is a diagram illustrating cross-sections of a first linear sub-track and a planar track, which are made of the same electrically conductive material, according to an embodiment.

A cross-section of a first linear sub-track 911 and a planar track 931 shown in FIG. 9 may correspond to a cross-section viewing of the first linear track 810 and the planar track 830 of FIG. 8 in a Z-axis direction. Referring to FIG. 9, it is assumed that the first linear sub-track 911 and the planar track 931 are made of the same electrically conductive material.

As described above, a thickness T3 of the planar track 830 may be formed to be less and thinner than a thickness T1 of the first linear sub-track 810, such that the resistance value Z1 in the first linear sub-track 810 and the resistance value Z3 in the planar track 830 are the same during heating. That is, when the first linear sub-track 911 and the planar track 931 are made of the same electrically conductive material, the thickness T3 of the planar track 931 may correspond to a thickness value for equalizing the resistance value Z1 of the first linear sub-track 911 and the resistance value Z3 of the planar track 931 based on an area of the planar track 931.

An upper surface of the planar track 931 corresponds to a sensor seating region 940 of the temperature sensor 540 (refer to FIG. 5).

FIG. 10 is a diagram illustrating cross-sections of a first linear sub-track and a planar track, which are made of different electrically conductive materials, according to an embodiment.

A cross-section of a first linear sub-track 1011 and a planar track 1031 shown in FIG. 10 may correspond to a cross-section viewing of the first linear track 810 and the planar track 830 of FIG. 8 in a Z-axis direction, in a case where the first linear track 810 and the planar track 830 are made of different electrically conductive materials. An upper surface of the planar track 1031 may correspond to a sensor seating region 1040 of the temperature sensor 540 (refer to FIG. 5).

Referring to FIG. 10, when the first linear sub-track 1011 and the planar track 1031 are made of different electrically conductive materials, a thickness T4 of the planar track 1031 may correspond to a thickness value for equalizing the resistance value Z1 in the first linear sub-track 1011 and a resistance value Z4 in the planar track 1031 based on an area of the planar track 1031 and resistance change characteristics (for example, TCR, a resistance temperature coefficient, or the like) of the planar track 1031.

FIG. 11 is a diagram illustrating cross-sections of a first linear sub-track and a planar track, which are made of different electrically conductive materials, according to another embodiment.

A cross-section of a first linear sub-track 1111 and a planar track 1131 shown in FIG. 11 may correspond to a cross-section viewing of the first linear track 810 and the planar track 830 of FIG. 8 in a Z-axis direction, in a case where the first linear track 810 and the planar track 830 are made of differently electrically conductive materials. An upper surface of the planar track 1131 may correspond to a sensor seating region 1140 of the temperature sensor 540 (refer to FIG. 5).

Referring to FIG. 11, depending on a type of an electrically conductive material of the planar track 1131 and an area of the planar track 1131, a thickness T1 of a first linear sub-track 1111 and a thickness T5 of the planar track 1131 may be formed the same to equalize the resistance value Z1 of the first linear sub-track 1111 and a resistance value Z5 of the planar track 1131.

That is, a thickness of a planar track according to embodiments of the present disclosure may be variously determined as a thickness value for equalizing a resistance value (resistance change characteristic) of a first linear sub-track and a resistance value (resistance change characteristic) of a planar track in the electrically conductive track pattern 521 (refer to FIG. 5) by considering the resistance change characteristic of the planar track according to a type of an electrically conductive material of the planar track and an area of the planar track.

FIGS. 12 and 13 are diagrams illustrating heaters manufactured by using a heating sheet of FIG. 5.

FIG. 12 is a diagram of the heater 13000 implemented in an external heater form 1200 for heating the outside of the cigarette 20000 as illustrated in FIG. 2 or 3. In detail, the heater 13000 of FIG. 2 or 3 corresponding to the external heater form 1200 may be manufactured by rolling the heating sheet 500 of FIG. 5 into a hollow cylindrical shape or a tubular shape such that the cigarette 20000 may be accommodated in an inner space of the heating sheet 500 and the outside of the cigarette 20000 may be heated. Herein, the temperature sensor 540 may be arranged to sense the temperature of the heater 13000. The heater 13000 implemented in the external heater form 1200 may be implemented by using at least one of the heating sheet 500, and at least one of the temperature sensor 540 may be arranged in a sensor seating region of each of the at least one heating sheet 500. That is, the heater 13000 implemented in the external heater form 1200 may be arranged with at least one of the temperature sensor 540. The temperature sensor 540 may be adhered to and arranged on the sensor seating region, and may sense at least one of the temperature of the heater 13000 and a temperature of a cigarette inserted into the aerosol generating device 10000 (refer FIG. 2 or 3).

An upper surface of the flexible substrate 510 (refer to FIG. 5) described in FIG. 5, that is, a layer on which the electrically conductive track pattern 521 (refer to FIG. 5) and the temperature sensor 540 seated thereon are formed, may be rolled to face the inner space of the heating sheet 500.

FIG. 13 is a diagram of the heater 13000 manufactured in a shape, in which a cylinder and a cone illustrated in FIG. 1 are combined, and implemented in an internal heater form 1300 inserted into the cigarette 20000. In detail, the heater 13000 of FIG. 1 corresponding to the internal heater form 1300 may be manufactured by being integrated with a structure 1310 in a form in which the heating sheet 500 surrounds the outside of the structure 1310 in which a cylinder and a cone are combined. Herein, the upper surface of the flexible substrate 510 (refer to FIG. 5) described in FIG. 5, that is, a layer on which the electrically conductive track pattern 521 (refer to FIG. 5) and the temperature sensor 540 seated thereon are formed, may surround the outside of the structure 1310 to face the outermost side of the heater sheet 500. The temperature sensor 540 may be adhered to and arranged on the sensor seating region, and may sense at least one of the temperature of the heater 13000 and a temperature of a cigarette inserted into the aerosol generating device 10000 (refer to FIG. 1).

Those of ordinary skill in the art related to embodiments of the present disclosure may understand that various changes in form and details can be made therein without departing from the scope of the characteristics described above. The disclosed methods should be considered in a descriptive sense only and not for purposes of limitation.

The invention claimed is:

1. A heater for an aerosol generating device, the heater comprising:

a flexible substrate formed of an insulating material; and a plane heating element which is configured to be heated by power supplied from a battery to generate aerosols and is formed on one surface of the flexible substrate, wherein the plane heating element is connected in series between two electrodes, and comprises an electrically conductive track pattern that is formed along a zigzag-shaped path and that comprises linear sub-tracks arranged side by side and bridge tracks connected to the linear sub-tracks, between the linear sub-tracks, and wherein the electrically conductive track pattern further comprises a sensor seating region connected in series between a first linear sub-track and a second linear sub-track which are adjacently arranged from among the linear sub-tracks, the sensor seating region formed of a planar track having an area on which an under-surface of a temperature sensor is configured to be seated.

2. The heater of claim 1, wherein a first resistance value in the first linear sub-track, a second resistance value in the second linear sub-track, and a third resistance value in the planar track are the same, upon heating by the power.

3. The heater of claim 2, wherein the planar track is formed as a flat plate having a thickness less than that of the first linear sub-track and the second linear sub-track in a direction perpendicular to an extending direction of the flexible substrate, and having a width greater than that of each of the first linear sub-track and the second linear sub-track.

4. The heater of claim 1, wherein a thickness of the planar track is determined as a thickness value for having the same resistance value as the first linear sub-track and the second linear sub-track, based on an area of the planar track and a resistance change characteristic of the planar track.

5. The heater of claim 2, wherein the planar track is formed of a same type of electrically conductive material as the first linear sub-track and the second linear sub-track.

6. The heater of claim 2, wherein the planar track is formed of an electrically conductive material having a different thermal coefficient resistance (TCR) from that of each of the first linear sub-track and the second linear sub-track.

7. The heater of claim 1, wherein the first linear sub-track and the second linear sub-track are arranged parallel along the zigzag-shaped path, and the planar track is connected in series between an end point of the first linear sub-track and a start point of the second linear sub-track.

8. The heater of claim 1, wherein the planar track is manufactured by an etching process or a printing process.

9. The heater of claim 1, wherein the heater is implemented in an external heater form that is configured to heat an outside of a cigarette inserted into the aerosol generating device.

10. The heater of claim 1, wherein a difference between a third resistance value in the planar track and each of a first resistance value in the first linear sub-track and a second resistance value in the second linear sub-track is within a predetermined threshold range.

11. The heater of claim 1, wherein each of a first resistance value in the first linear sub-track, a second resistance value in the second linear sub-track, and a third resistance value in the planar track is a resistance value between 0.5Ω and 2.0Ω.

12. The heater of claim 1, wherein the temperature sensor is adhered to and arranged on the sensor seating region, and is configured to sense at least one from among a temperature of the heater and a temperature of a cigarette inserted into the aerosol generating device.

13. An aerosol generating device comprising:

a heater;

a temperature sensor arranged on the heater and configured to sense a temperature of the heater;

a battery configured to supply power to the heater; and a controller configured to control the power supplied to the heater from the battery and monitor the temperature sensed by the temperature sensor, wherein the heater comprises:

a flexible substrate formed of an insulating material; and a plane heating element which is configured to be heated by the power supplied from the battery to generate aerosols and is formed on one surface of the flexible substrate, wherein the plane heating element is connected in series between two electrodes, and comprises an electrically conductive track pattern that is formed along a zigzag-shaped path and that comprises linear sub-tracks arranged side by side and bridge tracks connected to the linear sub-tracks, between the linear sub-tracks, and wherein the electrically conductive track pattern further comprises a sensor seating region connected in series between a first linear sub-track and a second linear sub-track which are adjacently arranged from among the linear sub-tracks, the sensor seating region formed of a planar track having an area on which an under-surface of the temperature sensor is seated.

14. The aerosol generating device of claim 13, wherein a first resistance value in the first linear sub-track, a second resistance value in the second linear sub-track, and a third resistance value in the planar track are the same, upon heating by the power.

15. The aerosol generating device of claim 13, wherein the controller is configured to control the power supplied to the heater based on the temperature that is monitored.

* * * * *